June 18, 1935.  P. O. WOODY  2,005,285
TOOL AND ACCESSORY CONTAINER
Filed June 6, 1933
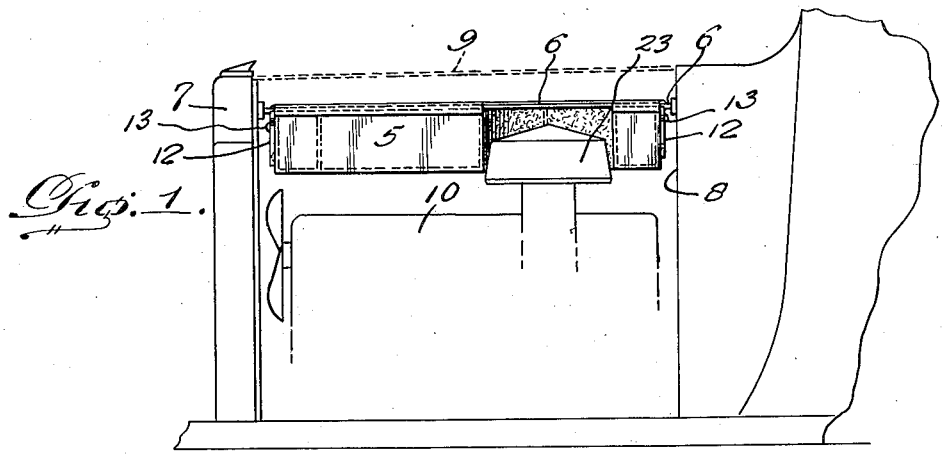
Fig. 1.
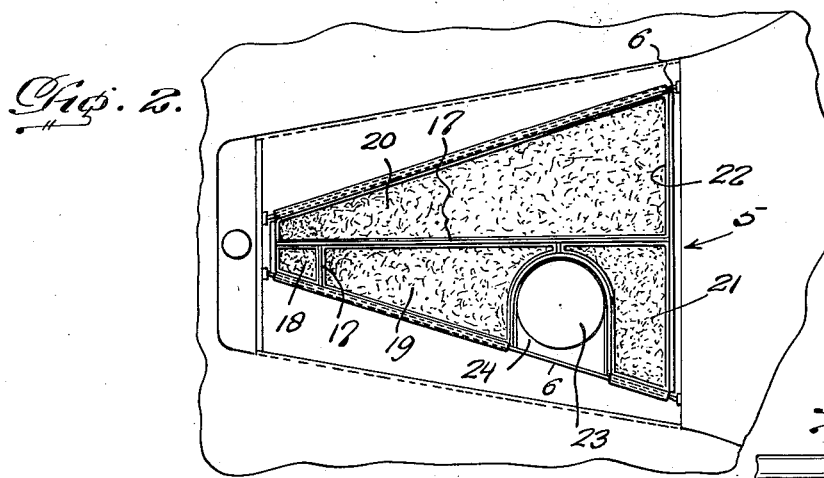
Fig. 2.
Fig. 4.
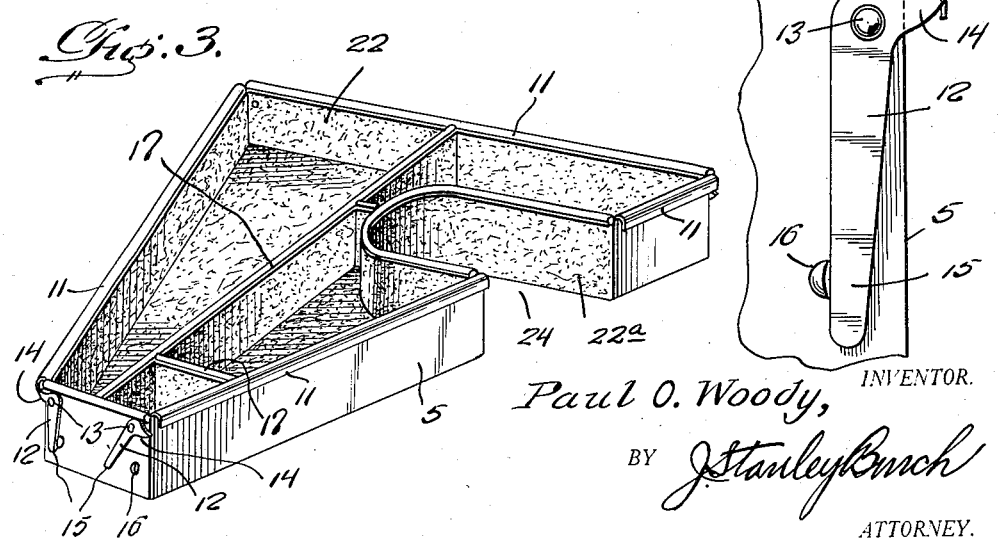
Fig. 3.
Paul O. Woody, INVENTOR.
BY J. Stanley Burch
ATTORNEY.

Patented June 18, 1935

2,005,285

UNITED STATES PATENT OFFICE 2,005,285

TOOL AND ACCESSORY CONTAINER

Paul O. Woody, Clearfield, Utah

Application June 6, 1933, Serial No. 674,589

2 Claims. (Cl. 224—29)

This invention relates to new and useful improvements in tool and accessory containers for automobiles, and the primary object of the invention is to provide means whereby frequently used tools and accessories may be stored so that the same will at all times be readily accessible, and whereby the requirement of opening tool chests or the raising of seats will be overcome.

More particularly, the present invention aims to provide a tool and accessory receptacle adapted to fit in the space above the engine and under the engine hood of an automobile between the diverging brace rods ordinarily provided to connect the radiator shell and the dash-board of the automobile, and means to mount said receptacle upon said brace rod so as to be supported by the latter.

A further object of the invention is to provide means for removably suspending the receptacle from the brace rod, so that the receptacle may be bodily removed from within the hood whenever desired for more convenient access to the tools and accessories stored in the container or receptacle.

Other objects and features of the invention will become apparent from the following description when considered in connection with the accompanying drawing, in which:

Figure 1 is a fragmentary side elevational view of the forward portion of an automobile with the engine hood thereof removed, and illustrating a tool and accessory container or receptacle constructed in accordance with the present invention, operatively mounted between the diverging brace rods which connect the radiator shell and dash-board of the automobile.

Figure 2 is a top plan view thereof.

Figure 3 is an enlarged perspective view of the tool or accessory container, detached from the automobile; and Figure 4 is an enlarged fragmentary transverse section showing details of one of the devices employed for fastening the tool and accessory container upon the diverging brace rods.

Referring more in detail to the drawing, the present invention includes a receptacle or container in the form of a shallow tray 5 which is tapered smaller from one end to the other and of such dimensions as to substantially fit in the space between the rearwardly diverging brace rods 6 commonly provided to connect the shell of the radiator 7 of the automobile with the dash 8 of the latter to brace said radiator and dash, the brace rods 6 being located directly under the engine hood indicated by dotted lines at 9, and above the engine 10.

The container 5 is preferably constructed of sheet metal and has the upper edges of its side and end walls rolled outwardly as at 11 for finishing and reinforcing purposes. The rolled edges of the diverging side walls of receptacle or container 5 are left open in the form of hook-shaped flanges as clearly illustrated in Figure 4 so as to engage over the brace rods 6 and thereby suspend the container or receptacle 5 from said brace rods in the space between the latter and between the engine 10 and its hood 9.

Means is provided to securely fasten the container or receptacle in place upon the brace rods 6, such means preferably consisting of catches 12 hinged at 13 to the opposite ends of the receptacle or container 5 adjacent the corners thereof and having outwardly and laterally extending ends 14 adapted to be swung into engagement with the under sides of brace rods 6 so as to draw the hook-shaped side flanges 11 into tight engagement with the brace rods 6 whereby the receptacle 5 is effectively prevented from vibrating relative to said brace rods 6 or from being accidentally disengaged therefrom. The hinged catches 12 also include handle portions 15, and projecting from the end walls of container 5 in the path of these handles are cam projections 16 past which the handles 15 of the catches 12 are adapted to be snapped so that the catches are effectively held in engagement with the brace rods 6 until manually released therefrom. Swinging movement of catches 12 in the proper direction to effect their release is permitted by springing the handles 15 of the catches outwardly so that they may pass inwardly by the projections 16. It will thus be seen that the receptacle or container 5 is effectively supported in a space which is ordinarily unused so that convenient access to the tools or accessories placed within said receptacle or container may be readily had upon opening the hood at either side. At the same time, if more thorough and convenient access to the tools and accessories is desired under adverse conditions, the container or receptacle may be readily detached from the brace rods 6 and bodily removed from within the hood of the engine.

To facilitate the orderly arrangement of tools and accessories within the container or receptacle 5, the latter is preferably divided by partitions 17, into a number of different size compartments 18, 19, 20 and 21, the compartment 18 being suitable for reception of an oil can, the compartment 19 being suitable for reception of small tools, the compartment 20 being suitable for reception of larger articles such as a car pump, a jack, tire changing tools and the like, and the compartment 21 being suitable for reception of small accessories such as tire patching materials, etc. These compartments are alined with soft or yielding material as at 22 so as to minimize noise due to rattling of the various tools and accessories against the walls of the compartment while the automobile is in motion.

In certain types of automobiles, the carburetor of the engine has an upstanding air intake projecting into the space between the hood and the engine at one side of the latter as indicated at 23. In order that the receptacle 5 may accommodate and snugly fit partly around this air intake, said receptacle is provided in one side at the proper point with a recess 24, and the wall of this recess is provided with a soft or yielding lining as at 22a so as to avoid marring of the contacting parts of the container 5 and air intake 23, as well as to prevent noise due to rattling of the container against said air intake while the automobile is in motion.

From the foregoing description, it is believed that the construction, manner of use, and advantages of the present invention will be readily understood and appreciated by those skilled in the art. It will be particularly understood that use of the present invention overcomes the requirement of opening tool chests or displacing passengers so that seats may be raised for access to tools and accessories carried on an automobile. The device is extremely simple and inexpensive in construction, and may be readily made in standard sizes and shapes for convenient use upon existing automobiles.

What I claim as new is:

1. A tool and accessory container including a tray-like sheet metal receptacle tapered smaller from one end to the other so as to fit in the space between the rearwardly diverging brace rods connecting the radiator and dash-board of an automobile, said receptacle having the upper edges of its side walls rolled outwardly, said outwardly rolled edges of said receptacle being in the form of hook-shaped flanges and constituting means for removably mounting the receptacle on said brace rods within said space, and manually operable means to firmly secure said hook-shaped flanges in quickly-releasable engagement with the brace rods.

2. A tool and accessory container including a tray-like sheet metal receptacle tapered smaller from one end to the other so as to fit in the space between the rearwardly diverging brace rods connecting the radiator and dash-board of an automobile, said receptacle having the upper edges of its side walls rolled outwardly, said outwardly rolled edges of said receptacle being in the form of hook-shaped flanges and constituting means for removably mounting the receptacle on said brace rods within said space, and pivoted catches mounted on the ends of the receptacle adjacent the corners thereof and movable into and out of engagement with the under sides of the brace rods to firmly releasably secure said flanges in quickly-releasable engagement with said brace rods.

PAUL O. WOODY.